(12) United States Patent
Wayner et al.

(10) Patent No.: US 7,664,212 B2
(45) Date of Patent: Feb. 16, 2010

(54) APPARATUS AND METHOD FOR SWITCHING CLOCKS WHILE PREVENTING GLITCHES AND DATA LOSS

(75) Inventors: Paul M. Wayner, Fairfax, VA (US); Adrian R. Macias, Vista, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 694 days.

(21) Appl. No.: 11/252,723

(22) Filed: Oct. 19, 2005
(Under 37 CFR 1.47)

(65) Prior Publication Data
US 2007/0086551 A1    Apr. 19, 2007

(51) Int. Cl.
*H04B 1/10*    (2006.01)
(52) U.S. Cl. .................. 375/349; 375/354; 713/322
(58) Field of Classification Search ............... 375/349; 713/322
See application file for complete search history.

(56) References Cited

U.S. PATENT DOCUMENTS

| | | | | |
|---|---|---|---|---|
| 6,618,455 B1 * | 9/2003 | Maeda et al. | ............... | 375/354 |
| 6,639,449 B1 * | 10/2003 | De La Cruz et al. | ........ | 327/407 |
| 7,366,091 B1 * | 4/2008 | Lahti et al. | ................. | 370/218 |
| 2006/0274815 A1 * | 12/2006 | Joseph | ...................... | 375/130 |

* cited by examiner

*Primary Examiner*—Curtis B Odom

(57) ABSTRACT

A apparatus (700) and method (600) are presented for preventing glitches and data loss in an Digital Base Band (DBB) portion (110) of an Ultra Wideband (UWB) receiver. a first and a second recovered clock (111, 112) and an external clock (109) can be input to a switch (116). Logical rules (490) can be used to determine conditions under which to hold the state of an output clock (310, 320) based on the states of a first clock (410, 420, 430, 440) and a second clock (450, 460, 470, 480) and the state of a switch request signal (312). In addition to holding the state of the output clock, a first data stream (501) associated with the first clock and a second data stream (502) associated with the second clock can be synchronized such that when switching from the first to the second clock no data loss will be experienced in the data stream.

20 Claims, 7 Drawing Sheets

APPARATUS AND METHOD FOR SWITCHING CLOCKS WHILE PREVENTING GLITCHES AND DATA LOSS

FIELD OF THE INVENTION

The present invention relates generally to wireless communication systems, such as ultra wideband (UWB) systems. In particular, the present invention relates to a system and method in a receiver, including receivers located in mobile transceivers, centralized transceivers, related equipment, for switching between clocks while preventing glitches and preventing data loss that may arise from a lack of synchronization between data streams associated with respective clocks.

BACKGROUND OF THE INVENTION

Ultra Wideband (UWB) receivers face unique challenges in signal reception due to low signal levels, high signal frequencies, and the like associated with the UWB signal environment. In particular, given that, for reasons understood in the art, UWB receivers are configured to rapidly and accurately process low power, high speed incoming analog signal components, an exemplary UWB receiver is configured with several receiver fingers each finger processing a version of the incoming signal. Each finger is capable of locking on a signal version and independently processing components of the signal including the signal preamble and the like. If a signal recovered from a particular receiver candidate finger possesses superior signal characteristics, such as superior signal-to-noise ratio or the like, that finger is chosen to process the signal. Likewise, if during processing on the new finger, a different candidate finger exhibits still better characteristics, such as a superior signal to noise ratio compared to the currently selected finger, the second new finger may be chosen for processing.

During processing, a signal associated with a successful candidate finger will be processed including recovering a clock from the signal and information in the form of, for example, a data packet will be recovered associated with the clock. On other fingers, a clock and data will also be recovered associated with the signal however the clock and data will often be slightly offset from the versions recovered from other fingers. In particular, the versions of the recovered clock from each of the fingers will often be phase indeterminate in comparison to each other. Still further, the data associated with each of the fingers may be offset in time by several data segments. One of the recovered clocks associated with the currently selected finger is used within the receiver circuit to clock data through receiver circuit sections and into the digital processing modules.

It will be appreciated that when a receiver is processing an incoming signal from one finger, and determines that a switch to another finger is advantageous, challenges can arise when the switchover is conducted, particularly when the clock switchover is conducted and the clocks are shifted in phase relative to each other. If the state of the clock of the currently selected finger does not match the state of the clock associated with the candidate finger being switched to, glitches in the clock state can occur during the switchover. Since the recovered clock is used within the receiver to process data through the receiver, such glitches are undesirable in that they can cause data loss, loss of receiver synchronization, can cause the receiver registers to enter into an undefined or indeterminate state, and can give rise other potentially more serious problems. To further complicate the clock switchover scenario, data streams associated with the receiver fingers may be slightly offset from one another resulting in a packet loss or other, potentially worse consequences when the switchover occurs.

Thus it would be advantageous for a receiver to be capable of providing a smooth transition between clocks when switching from processing on one receiver finger to another or when switching between any clock sources. Such a receiver could be more simply constructed and could reduce the likelihood of dropped packets, loss of synchronization, and the like.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Figure 1:
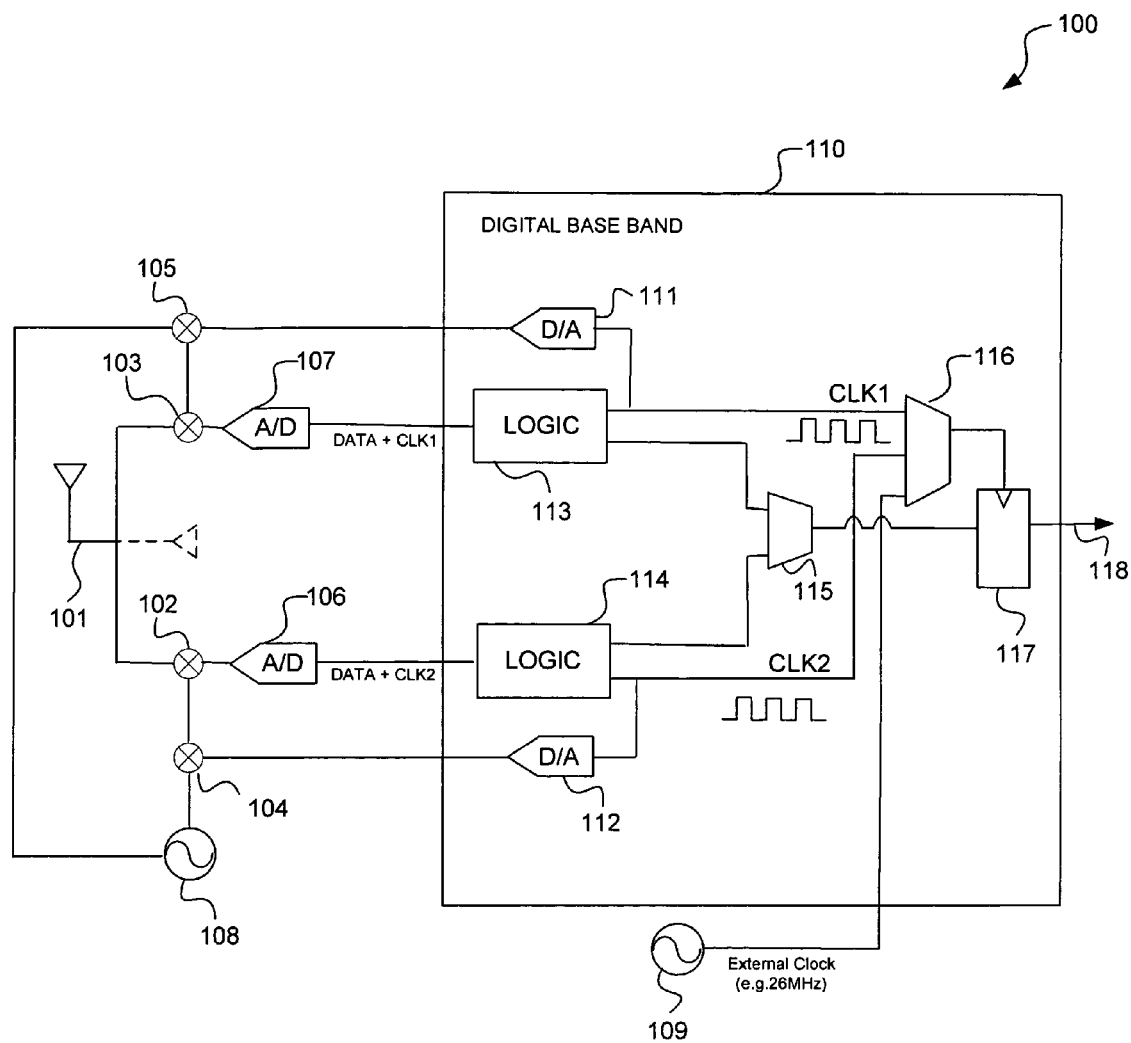
FIG. 1 is a diagram illustrating portions of an exemplary Ultra Wideband (UWB) receiver in accordance with various exemplary embodiments of the present invention.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as an embedded processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

While the present invention can be described in connection with a wireless UWB receiver, it can be practiced on any electronic circuit or device of any kind including wired devices such as wired UWB receivers or any devices where smooth switching between clock sources is desired. It should further be noted that while the present invention is directed to clocks recovered from the same transmitted signal, which recovered clocks are phase indeterminate with respect to each other, the present invention can provide smooth clock switching between asynchronous clocks and other unrelated clocks as will be described in greater detail hereinafter.

In accordance with various embodiments, a method is disclosed herein for switching between two clocks in a device, such as an electronic device, receiver, UWB receiver, or the like. The clocks can be phase indeterminate clock, asynchronous clocks, recovered clocks, system clocks, external clocks, or other clocks, or a combination thereof. The clocks offset from each other according to a difference associated with a parameter, such as a phase difference associated with a phase parameter, or a frequency difference associated with a frequency parameter or the like. An output clock is generated from a selected clock. While generating the output clock from the selected clock, it can be determined that a request to switch from the selected clock to another clock is pending, such as by receiving a switch request signal or the like. It will be appreciated that when the determination is made, in accordance with the present invention, the exemplary method includes waiting for the selected clock to transition to a predetermined state. Once the selected clock has transitioned to the predetermined state, the output clock is held in the predetermined state until the other of clock, that is the clock to be switched to, transitions to the predetermined state, if is it not already in that state when the request to switch is pending. Once the clock to be switched to transitions to predetermined state a switch is made from the selected clock to the other clock. It will be appreciated that when the switch to the other clock is made, the output clock is then generated from the clock that has been switched to. As noted above the two clocks can include two asynchronous clocks, two phase indeterminate clocks, or the like.

Where the two clocks are phase indeterminate clocks, one of the phase indeterminate clocks is recovered from a first processing path and another of phase indeterminate clocks is recovered from a second processing path. The first processing path and the second processing path can be associated, for example, with processing a received signal, such processing a received signal over a wireless interface in a UWB receiver.

A received signal can be processed including a first data stream associated with a first processing path and a second data stream associated with a second signal path and the two clocks can include two phase indeterminate clocks, as recovered for example from the first and second processing paths. When the clocks are phase indeterminate clocks recovered from a received signal, it will be appreciated that synchronizing must be performed. Accordingly, the second data stream associated with the second one of the two phase indeterminate clocks must be synchronized with the first data stream associated with the first one of the two phase indeterminate clocks since switching will be from the first clock to the second clock. Switching is then performed from the selected one to the other of the two phase indeterminate clocks when the other of the two phase indeterminate clocks transitions to the predetermined state and the second data stream is synchronized with the first data stream. The two clocks can alternatively include a phase indeterminate clock and an internal clock associated with a UWB receiver. The phase indeterminate clock can be used to generate the output clock and switching can thus be performed from the selected clock to the internal clock when the state of the internal clock transitions the state associated with the selected clock.

A received signal can be processed on a first signal path and a second signal path associated with the exemplary device. The request to switch can be determined by comparing a first metric, such as a first signal-to-noise ratio (SNR) associated with the received signal on the first signal path with a second metric such as a second SNR associated with the received signal on the second signal path.

In accordance with another exemplary embodiment, a circuit is disclosed for switching between two clocks in an electronic device. The circuit includes a source associated with the two clocks, such as a clock circuit, a signal source, or the like, and a controller coupled to the source. The controller can be configured to generate an output clock from a selected one of the clocks. The controller can further generate a switch request signal indicating a change is pending between the selected clock and another clock. When the switch request is generated, the controller is configured to wait for the selected clock to transition to a predetermined state. The controller then holds the output clock in the predetermined state when the switch request signal is generated until the other clock transitions to the predetermined state, if not already in the predetermined state when the switch request signal is generated. The controller then switches to the other clock when it transitions to the predetermined state. The exemplary circuit can further include a receiver portion having a first signal path and a second signal path processing a received signal. In such an embodiment, the two clocks include two phase indeterminate clocks and the received signal includes a first data stream associated with the first signal path and a second data stream associated with the second signal path. The controller, can generate the switch request signal when a signal metric associated with the received signal on one of the signal paths meets a predetermined criteria such as a SNR when compared to a reference value such as a reference SNR associated with the received signal on the other signal path. The controller is further configured to synchronize one of the data streams with the data stream associated with the selected clock when the switch request is generated. It will be appreciated that in some embodiments, the first signal path and the second signal path include a first receiver finger and a second receiver finger associated with a UWB receiver. In still other embodiments, the exemplary circuit includes a system clock. The controller is then further configured to switch to the system clock when a state of the system clock transitions the predetermined state associated with the selected clock. It will be appreciated that the controller can include a digital signal processor, an application specific integrated circuit (ASIC), a general purpose processor, or the like.

In accordance with another exemplary embodiment, a system is disclosed for switching between two clocks in a communication device. The system can thus include a Physical Layer (PHY) portion for performing the processing of a received signal, and a Media Access Control (MAC) portion for conducting higher layer functions associated with the communication device as will be appreciated by one of ordinary skill. The PHY portion can include a digital baseband controller configured to generate an output clock from a selected one of the two clocks and generate a switch request signal. When the switch request is generated indicating that a switch of clocks is desired, the controller is configured to wait for the selected clock to transition to a predetermined state. The output clock is then held in the predetermined state when the switch request signal is generated until one of the two clocks different from the selected clock transitions to the predetermined state, if not already in the predetermined state when the switch request signal is generated. The digital baseband controller is further configured to switch to the one clock when it transitions to the predetermined state. In some embodiments, the PHY portion can include a first receiver finger and a second receiver finger associated with processing the received signal in the communication device. Accordingly, the received signal includes a first phase indeterminate clock associated with the first receiver finger and a second phase indeterminate clock associated with the second receiver finger. The received signal also includes a first data stream associated with the first receiver finger and a second data stream associated with the second receiver finger. In such an embodiment, the digital baseband controller is configured to synchronize one of the data streams with another of the data streams associated with the selected one of the phase indeterminate clocks when the switch request is generated. The digital baseband controller is configured to generate the switch request signal when a signal metric associated with the received signal on one of the receiver fingers meets a predetermined criteria such as an SNR when compared to a reference value such as a reference SNR associated with the received signal on the other receiver finger associated with the selected one of the two clocks. In other embodiments, the system includes a system clock, and the digital baseband controller is further configured to switch to the system clock when its state transitions the predetermined state associated with the selected clocks. It will be appreciated that the digital baseband controller can include a digital signal processor, an application specific integrated circuit (ASIC), or a general purpose processor.

Signal Environment

A receiver portion 100, which could be part of a UWB receiver for example, as shown in FIG. 1, or which could be part of any receiver or device which uses multiple clocks, includes circuits associated with two exemplary receiver fingers. It will be appreciated that while two fingers are shown for illustrative purposes and for simplicity, several fingers may be present in accordance with various embodiments. In addition to clocks recovered from receiver fingers or the like, any clocks used to generate an output clock can be switched between using the present invention. An antenna 101 is used to receive the UWB signal from the air interface and, while shown as a single antenna, may also include several antennae such as in a diversity configuration. Also as shown, a signal can alternatively be input from a signal source directly connected to the input section to which antenna 101 is connected. It will be appreciated that in such a wired configuration an antenna would not be required.

The receiver fingers can include a mixer 102 and a mixer 103, which in turn are supplied with a version of the received signal from antenna 101, and a signal from a mixer 104 and a mixer 105 respectively, which generate a controlled local oscillator signal. A local oscillator 108 can provide the local oscillator signal, which can be modulated and otherwise controlled at mixers 104 and 105 by way of a feedback connection to a module typically referred to as a Digital Base Band (DBB) 110. An external clock 109, such as a 26 MHz clock can also be provided. The DBB 110, by way of Digital-to-Analog (D/A) converter 111 and D/A converter 112 can control the local oscillator signal that is eventually mixed with the signal versions in the receiver fingers by providing a modulated signal to mixers 104 and 105. For example, the local oscillator signal can be adjusted such that a high degree of correlation is achieved with the received signal. When the signal is converted, for example, at an Analog-to-Digital (A/D) converter 106 and an A/D 107, a digital version of the signal containing data plus clock is received at the DBB 110, for example, in a logic unit 113 and a logic unit 114 respectively. The logic unit 113 and the logic unit 114 can be used to recover a clock signal CLK1 and a clock signal CLK2 respectively and respective data streams.

The data streams can be input to a switch 115 and the currently selected data stream from the currently selected finger, which is also the source of the currently selected clock signal, will be clocked through the data register 117. It will be appreciated that while the circuit elements are shown in the simplest form, they may include additional elements. For example, the switches 115 and 116 include a switch control signal which has been omitted for the sake of simplicity. Further, the register 117 may contain additional storage units which are also not shown for the sake of simplicity, for example to allow several delayed versions of the data stream to be stored or the like. The clock signals CLK1 and CLK2 can be input to a switch 116. The clock signals CLK1 and CLK2 can also be fed back to D/A converters 112 and 111 respectively where they can be used to control the application of the local oscillator signal 108 as will be appreciated. As noted, the currently selected clock can be used to clock data through the receiver to generate a data output stream 118. It should also be noted that while it is described herein that switching occurs from a currently selected clock, that is, a clock associated with a currently selected finger, to a clock associated with a finger having a superior metric, switching can also be performed between a currently selected clock and a system clock or an external clock such as clock 109.

Clock and Data Stream Timing

Figure 2:
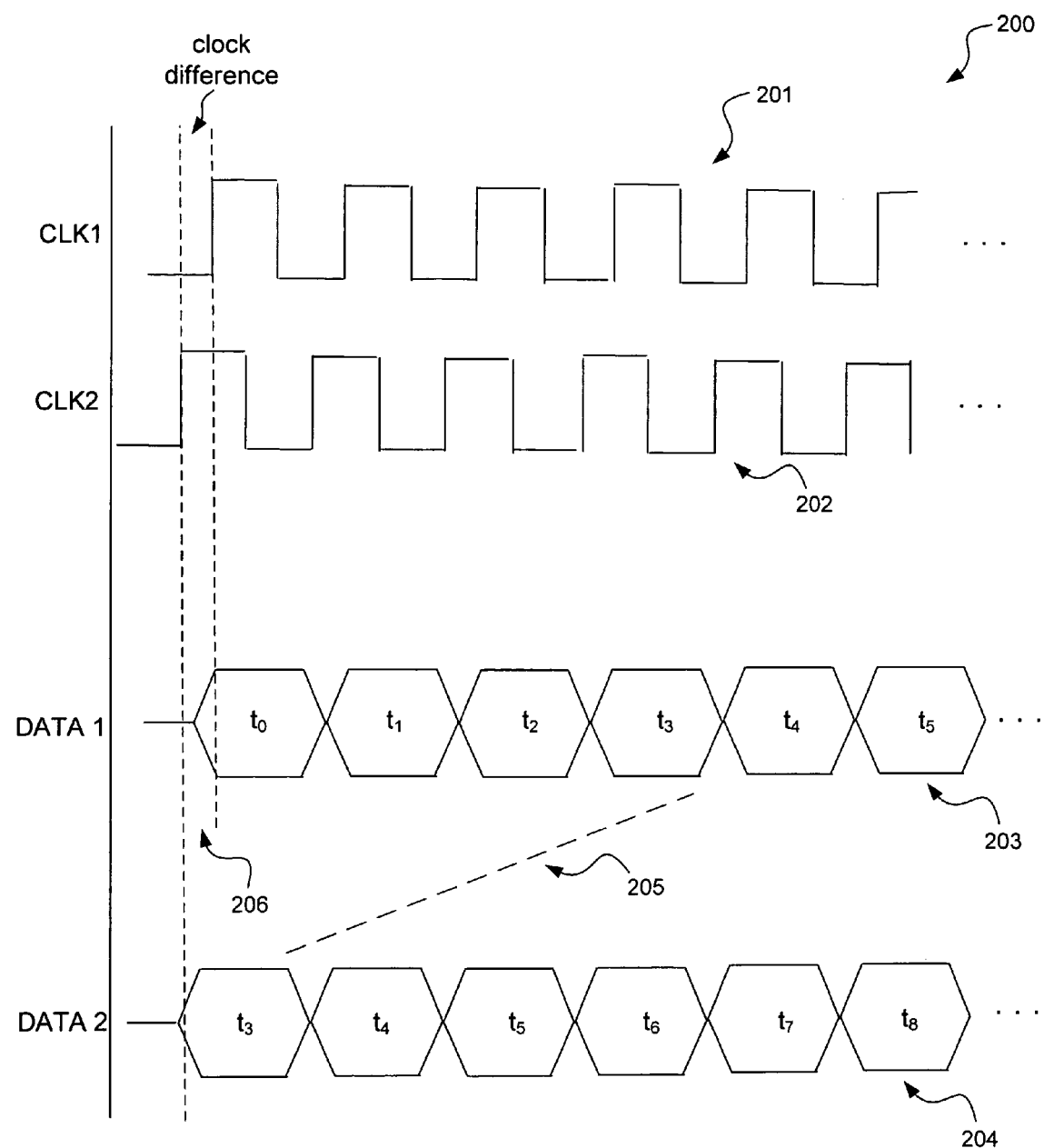
FIG. 2 is a block diagram illustrating a phase offset between clocks and an offset between data streams in an exemplary receiver in accordance with various exemplary embodiments of the present invention.

In accordance with various exemplary embodiments, the recovered clocks CLK1 201 and CLK2 202 in the exemplary receiver are phase indeterminate with respect to each other and the data streams DATA1 203 and DATA2 204 may be offset in time by a certain number of data segments corresponding to the time offset as shown in scenario 200 of FIG. 2. A clock offset 206 can be experienced as a phase shift between the clocks arising from slight differences in the received signal version processed on the respective receiver fingers due to signal dispersion, multi-path, or the like. The data streams DATA 1 203 and DATA 2 204 may be offset by an offset 205 which is illustrated as a time offset between identical segments. For example, it can be seen that in the data stream DATA 1 203, segment $t_3$ is offset behind segment $t_3$ in the data stream DATA 2 204 by three time intervals. Accordingly, when a switchover from CLK1 to CLK2 is requested, synchronization of the data streams must also be accomplished to ensure that data is not unnecessarily lost due to a dropped packet or the like. If the present invention is used to switch between asynchronous clocks, then it will be appreciated that it will not be possible to synchronize the data streams.

Figure 3:
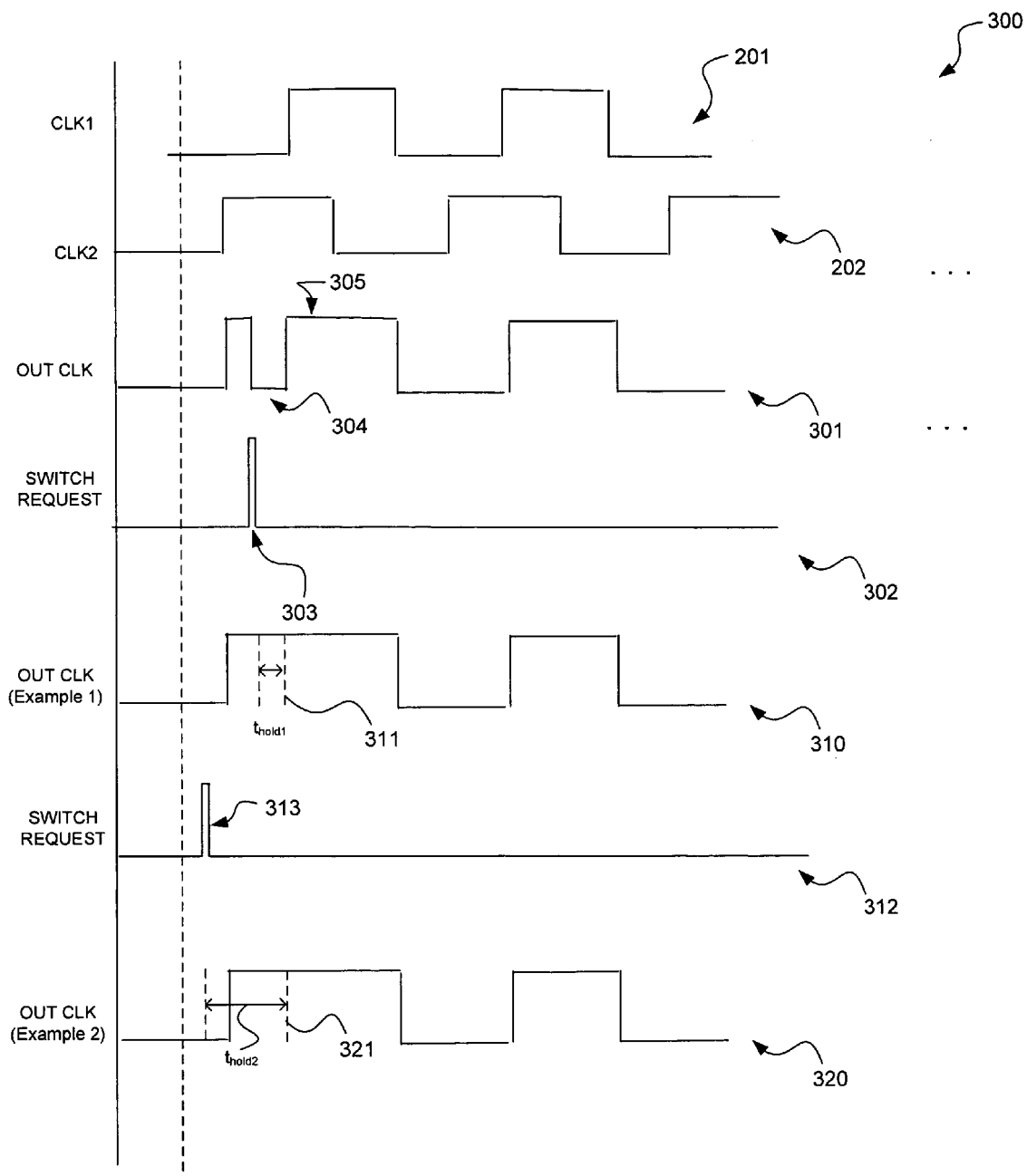
FIG. 3 is a diagram illustrating a glitch scenario and a clock hold interval in accordance with various exemplary embodiments of the present invention.

A timing diagram 300 in FIG. 3 shows a clock glitch and two examples of de-glitching in accordance with various embodiments. The recovered clocks CLK1 201 and CLK2 202 are shown with a phase difference as described above in connection with FIG. 3. It will be appreciated that when a finger is chosen as having the superior metric, the clock associated with that finger will be selected and used to generate the output clock, such as a OUT CLK 301. In the exemplary scenario shown in FIG. 3, assume that the finger associated with CLK2 was previously chosen as having the superior metric. After operation for some time, the finger associated with CLK1 is now determined to have a superior metric and a SWITCH REQUEST signal 302 is generated having a pulse 303. Without de-glitching such as in accordance with the present invention, the selected clock switches immediately from CLK2 202 to CLK1 201 and the OUT CLK 301 will experience a glitch in the form of an anomalous transition low at 304 corresponding to the state of CLK1 201 and back high at 305 when CLK 1 transitions high. Depending on the degree of phase difference between signals the glitch can be of a short or a long duration and can result in adverse impact to timing and synchronization throughout the receiver. In extreme cases, the receiver registers can lock into an undefined state and the receiver can shut down completely.

In accordance with the present invention however, through the operation of logic associated for example with the DBB 110 and as will be described in greater detail hereinafter, the state of the output clock can be held to a high state until the state of the clock being transitioned to achieves the same state. For example, again switching from CLK2 202 to CLK1 201 based on the same SWITCH REQUEST signal 302 with pulse 303, an exemplary OUT CLK 310 can be held for the duration of a first hold interval 311 corresponding to the time between the pulse 303 and the beginning of the high transition of CLK1 201. In this way there is no anomalous transition with the only impact being a slightly longer duty cycle affecting one period of the OUT CLOCK 310. In a second example, again switching from the CLK1 201 to the CLK2 202 based on a SWITCH REQUEST signal 312 having a pulse 313, an OUT CLK 320 remains unaffected until the rising edge of CLK2 202. At the rising edge of the CLK2 202, the OUT CLK 320 is considered held until the CLK1 201 reaches a high state. Thus, during the second hold interval 321 the OUT CLK 320 is controlled by logical rules as will be described hereinafter.

Output Clock Logic State Machines

Figure 4:
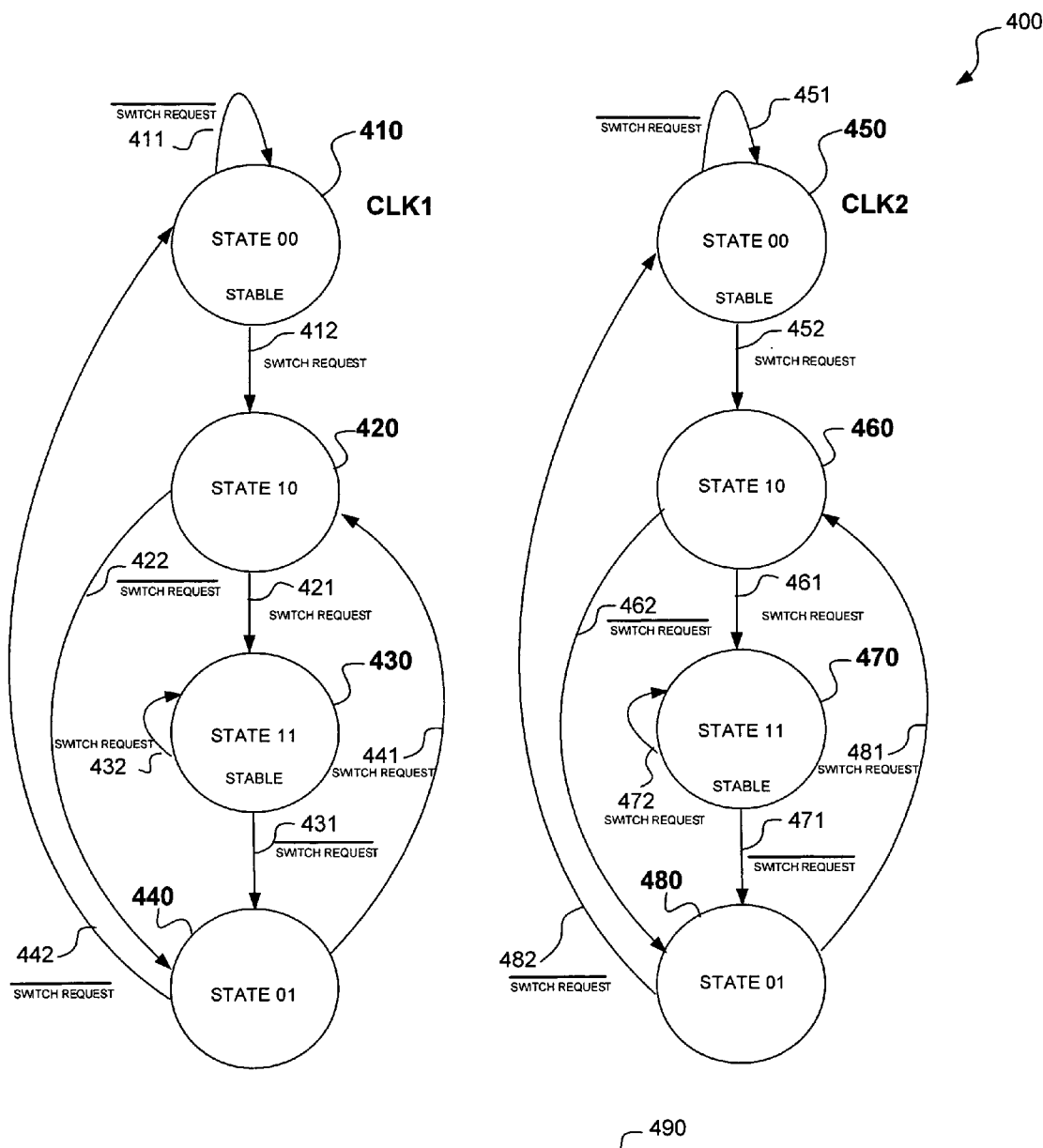
FIG. 4 is a pair of state diagrams illustrating state transitions for CLK1 and CLK2 in accordance with exemplary embodiments of the present invention.

To better understand exemplary logic governing the holding of the output clock in accordance with the invention, an exemplary pair of state diagrams 400 for a first and a second clock is shown in FIG. 4 and described herein. For each clock such as, for example, CLK1 201 and CLK2 202, a state diagram can be used to illustrate various transitions based on input in the form of the SWITCH REQUEST signal or SWITCH REQUEST(NOT) (shown as SWITCH REQUEST with an overbar) and based on the state of the clock signal itself. For a first clock, such as CLK1 201, a STATE 00 410 is indicated as a stable state. From the STATE 00 410, a SWITCH REQUEST signal will cause a transition 412 to a STATE 10 420, which is an unstable state. A SWITCH REQUEST(NOT) will cause a loop transition 411 keeping operation within the STATE 00 410. From the STATE 10 420, a SWITCH REQUEST signal will cause a transition 421 to a STATE 11 430, which is a stable state. A SWITCH REQUEST(NOT) will cause a transition 422 to a STATE 01 440. From the STATE 11 430, a SWITCH REQUEST(NOT) will cause a transition 431 to the STATE 01 440. A SWITCH REQUEST signal will cause a loop transition 432 keeping operation within the STATE 11 430. From the STATE 01 440, a SWITCH REQUEST signal will cause a transition 441 to the STATE 10 420. A SWITCH REQUEST(NOT) from the STATE 01 440 will cause a transition 442 back to the STATE 00 410.

Similarly, for a second clock, such as CLK2 202, a STATE 00 450 is indicated as a stable state. From the STATE 00 450, a SWITCH REQUEST signal will cause a transition 452 to a STATE 10 460, which is an unstable state. A SWITCH REQUEST(NOT) will cause a loop transition 451 keeping operation within the STATE 00 450. From the STATE 10 460, a SWITCH REQUEST signal will cause a transition 461 to a STATE 11 470, which is a stable state. A SWITCH REQUEST(NOT) will cause a transition 462 to a STATE 01 480. From the STATE 11 470, a SWITCH REQUEST(NOT) will cause a transition 471 to the STATE 01 480. A SWITCH REQUEST signal will cause a loop transition 472 keeping operation within the STATE 11 470. From the STATE 01 480, a SWITCH REQUEST signal will cause a transition 481 to the STATE 10 460. A SWITCH REQUEST(NOT) from the STATE 01 480 will cause a transition 482 back to the STATE 00 450.

It should be noted that the above described state machines operate more or less independently in accordance with the two clocks, which can include recovered clocks, system clocks, a combination thereof, or any clocks where switching from one to the other is required, while mitigating glitches, based on the current clock state and the state of the SWITCH REQUEST signal. Further, the state of the output clock can be generated from the current state of the state machines described above in connection with the CLK1 201 and the CLK 2 202 and the state of the SWITCH REQUEST signal in accordance with a logical expression 490. Using the logical expression 490, for example, it would be possible for one of ordinary skill in the art to be able to design logic to control the output clock state. It will also be appreciated that while two clocks are shown as candidate clocks for exemplary purposes, additional clocks can be drawn from and used as candidates although switching will always occur between two clocks such as from a currently selected clock to another clock.

Data Stream Synchronization

Figure 5:
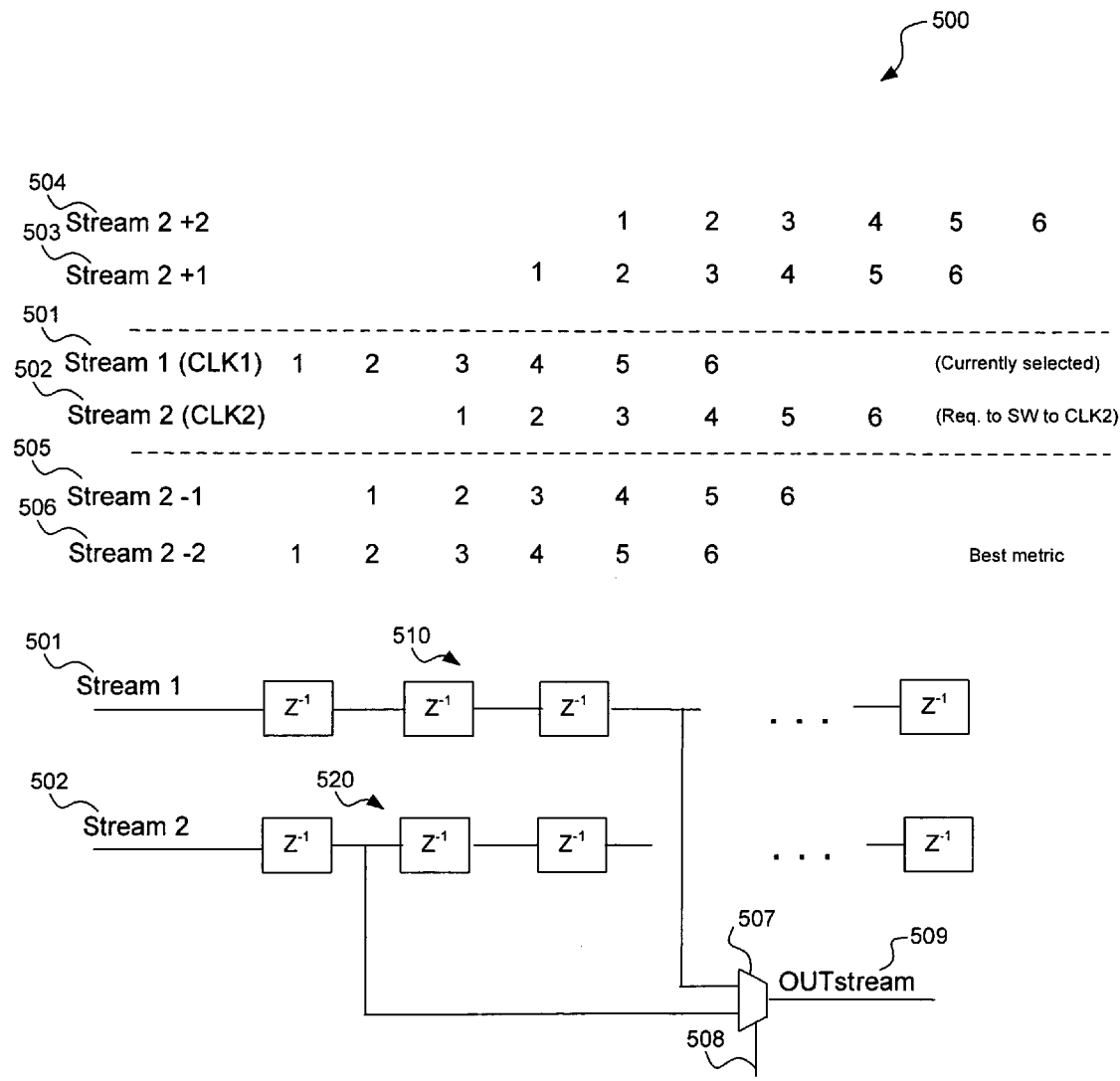
FIG. 5 is a diagram illustrating exemplary data stream synchronization in accordance with exemplary embodiments of the present invention.

When clock switching is requested, such as between recovered clocks from different fingers of a receiver, which clocks are phase indeterminate with respect to each other, the integrity of the data is of great concern and thus an exemplary data synchronization scenario 500 is shown in FIG. 5. A first data stream STREAM 1 501 associated with the CLK1 201 is shown as the currently selected stream. A second data stream STREAM 2 502 associated with the CLK2 202 is shown delayed in time relative to the STREAM 1 501 by two data intervals. To address the issues associated with data stream synchronization, it is important to keep running buffers of each of the data streams, such as a stream buffer 510 for the STREAM 1 501 and a stream buffer 520 for the STREAM 2 502, so that synchronization can be accomplished as follows. For example, it can be seen that in preparation for synchronizing the STREAM 2 502 at clock switchover, several versions of the STREAM 2 502 can be kept. A STREAM 2+1 503 represents the STREAM 2 502 with a one data interval delay, a STREAM 2+2 504 represents the STREAM 2 502 with a two data interval delay, a STREAM 2−1 505 represents the STREAM 2 502 one data interval ahead, and a STREAM 2−2 506 represents the STREAM 2 502 two data intervals ahead. During processing in preparation for a clock switchover, the various versions of the STREAM 2 502 such as the STREAM 2+1 503, the STREAM 2+2 504, the STREAM 2−1 505, and the STREAM 2−2 506 can be compared with the STREAM 1 501 associated with the currently selected clock, such as the CLK1 201. The versions providing the best comparison metric can be presumed to be the most closely correlated stream and thus will be selected at switchover to ensure that no interruption in the data stream is experienced as a result of clock switchover. When the clock switchover occurs, the new stream such as the STREAM 2−2 506 version of STREAM 2 502 can be selected at switch 507 with a control signal 508 in order to generate the output stream such as a OUTstream 509. Again, it should be noted that when switching between asynchronous clocks, data synchronization will not be possible in accordance with the present invention.

It should be noted that the stream buffers 510 and 520 can be an arbitrary size but should be long enough to allow room for shifting in time when switching clocks. Further, a position within the center of the stream buffers 510 and 520 should be established during frame processing such that when a delayed version of the stream is sought there is an adequate number of delayed versions of the stream available. In some embodiments, the position of tapping from the stream buffers, shift registers or the like, can be reset, for example to the center, when not actively processing data such as between the reception and processing of data packets or the like. However, it is also advantageous to establish the overall size of the stream buffers to provide adequate length to account for the majority of the delay scenarios likely to be encountered.

Figure 6:
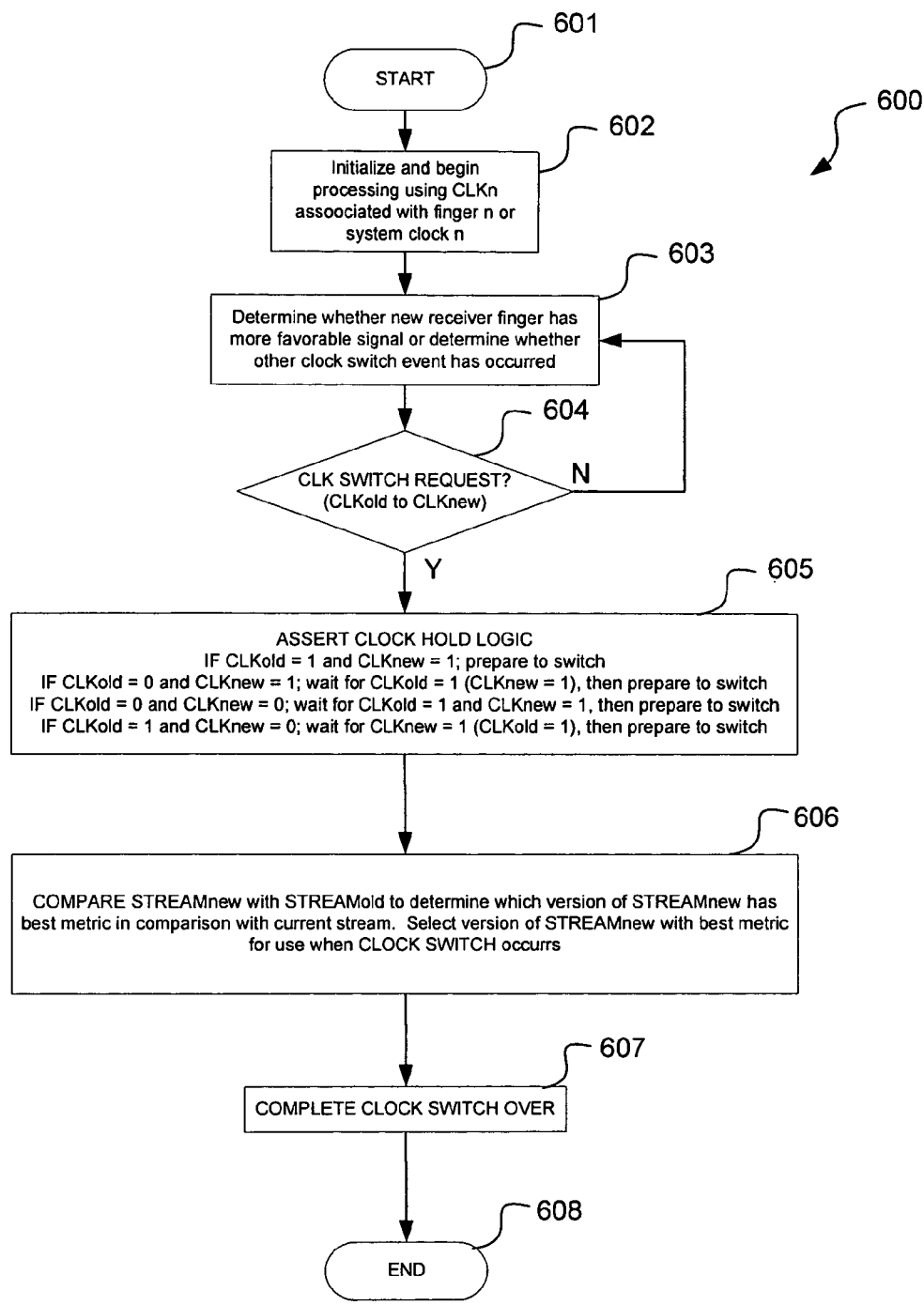
FIG. 6 is a flow chart illustrating an exemplary procedure for clock switching and data synchronization in accordance with exemplary embodiments of the present invention.
Figure 7:
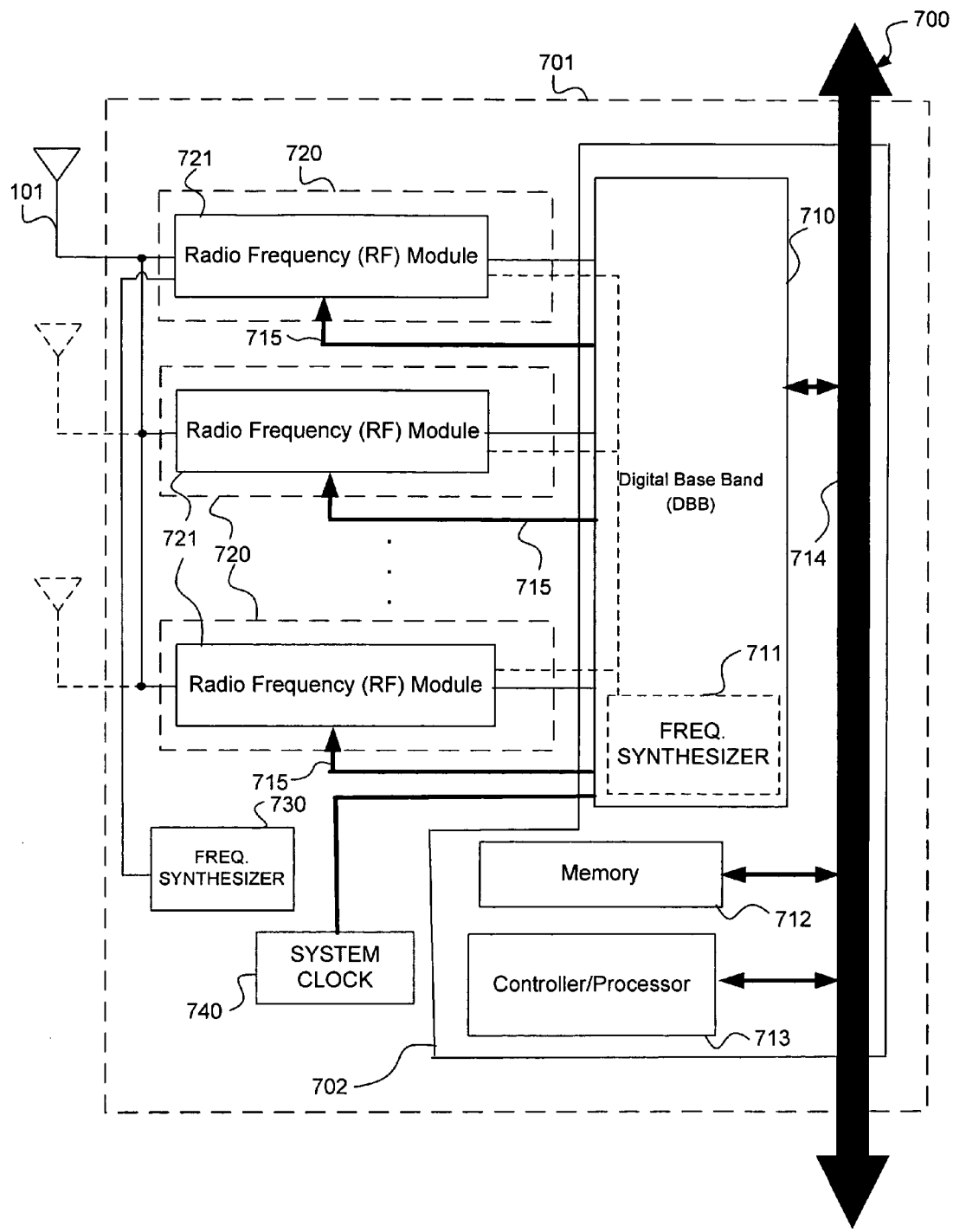
FIG. 7 is a diagram of a receiver apparatus in accordance with various exemplary embodiments of the present invention.

The present invention can be embodied in an exemplary procedure 600 as shown in FIG. 6 and described herein. After start at 601, for example after power-up or the like, the receiver can be initialized during an initialization/calibration period at 602 and can begin processing using a selected finger n having a clock CLKn or can use a system clock n. Continuously during processing, the receiver will compare a metric such as a signal-to-noise ratio (SNR) for all the fingers and determine whether a new finger other than the currently selected finger has a superior metric or whether another clock switch event has occurred such as a command to switch to an external clock or system clock at 603. When the exemplary receiver determines that a clock switch should be made such as from a CLKold to a CLKnew, a clock switch request signal is generated. If the clock switch request signal is received at 604, then the clock hold logic, as described for example in connection with FIG. 4, can be asserted at 605 to hold the output clock in a desired state until the new clock reaches a desired state. For example, if both the CLKold and the CLKnew are logic "1," that is, in a high state, preparation to switch, including data synchronization, can be made. If CLKold is logic "0" and CLKnew is a logic "1" then the logic will cause the receiver to wait for the CLKold to transition to the logic "1" state. If the CLKnew is still logic "1" then preparation to switch will be made while holding the output clock at logic "1" corresponding to the state of the CLKold. If both CLKold and CLKnew are logic "0" then the logic will cause the receiver to wait until CLKold is logic "1." The output clock will then be held to a logic "1" state until the CLKnew is logic "1" at which time a preparation to switch will be made. If CLKold is logic "1" and CLKnew is a logic "0" then the logic will cause the receiver to wait for the CLKnew to transition to the logic "1" state. If the CLKold is still logic "1," then preparation to switch will be made while holding the output clock at logic "1" corresponding to the state of the CLKold.

As noted above, when switching between clocks having an indeterminate phase, preparations to switch can include comparing the data streams such as STREAMnew with STREAMold to determine which version of STREAMnew, from a stream buffer as described above in connection with FIG. 5, provides a best metric at 606. When the version of STREAMnew is selected, the clock switchover can be completed at 607 and the procedure can end at 608. It will be noted however, that while the present invention is focused on switching over from one clock to another and synchronizing data in accordance with the description provided herein, since the exemplary receiver will continue to search for fingers having superior metrics as compared with the currently selected finger the procedure described hereinabove will be performed repeatedly during the course of operation.

The exemplary method or procedure 600 or alternative procedures can be implemented in an apparatus or system 700, which in accordance with some embodiments, can represent in a more detailed fashion the UWB receiver portion 100 of FIG. 1, the stream buffers 510 and 520 of FIG. 5, which can be implemented in hardware or software registers as would be appreciated by one of ordinary skill, and the like. A receiver portion 701 can therefore include several Radio Frequency (RF) portions 720 coupled to an antenna 101, several antennas, or directly to a source in a wired configuration. The RF portions 720 can include RF module 721 which can include, for example, local oscillators mixers circuits and the like as shown for example in FIG. 1. The RF portions 720 and the RF modules 721 represent the individual receiver fingers and are coupled to a Digital Base Band (DBB) 710 in a processor portion 702. The processor portion 702 includes the DBB 710, which can optionally include a frequency synthesizer 711, a memory 712, and a controller/processor 713, which can be a general purpose processor, a digital signal processor, an Application Specific Integrated Circuit (ASIC) or the like. The logic, for example, as described in connection with FIG. 4 and FIG. 6 can be implemented completely in the DBB 710 or can be implemented partially in the controller/processor 713. Further the data stream buffer 510 and 520 and additional buffers corresponding to receiver fingers can be implemented in the DBB 710 or can be implemented in the memory 712 or implemented at least partially in registers within the controller/processor 713.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for switching between two clocks in a device, the method comprising:
   receiving an incoming signal at a receiver circuit to produce a received signal;
   generating an output clock from a selected one of the two clocks;
   waiting for the selected one of the two clocks to transition to a predetermined state; and
   holding the output clock in the predetermined state until the other of the two clocks transitions to the predetermined state, if the other of the two clocks is not in the predetermined state when the request to switch is pending,
   wherein the two clocks include a first phase indeterminate clock recovered from a first processing path associated with processing the received signal,
   wherein the selected one of the two clocks is the first phase indeterminate clock, and
   wherein the request to switch from the selected one of the two clocks to the other of the two clocks occurs when a signal metric associated with the received signal on the first processing path meets a predetermined criteria when compared to a reference value.

2. A method as recited in claim 1, further comprising switching from the selected one of the two clocks to the other of the two clocks when the other of the two clocks transitions to the predetermined state so as to generate the output clock from the other of the two clocks.

3. A method as recited in claim 1, wherein the two clocks include two asynchronous clocks, the method further comprising switching from the selected one to the other of the two asynchronous clocks when the other of the two asynchronous clocks transitions to the predetermined state so as to generate the output clock from the other of the two asynchronous clocks.

4. A method as recited in claim 1, wherein:
   the two clocks include the first phase indeterminate clock and a second phase indeterminate clock, and
   the second phase indeterminate clock is recovered from the second processing path associated with processing the received signal.

5. A method as recited in claim 1, wherein the clocks are offset from each other according to a difference associated with a parameter:
   the parameter includes one of a phase parameter and a frequency parameter; and the difference includes one of a phase difference and a frequency difference.

6. A method as recited in claim 1,
   wherein the two clocks include the first phase indeterminate clock and a second phase indeterminate clock,
   wherein the second phase indeterminate clock is recovered from a second processing path associated with processing the received signal, and
   wherein the first processing path and the second processing path are associated with processing a signal received over a wireless interface in a UWB receiver.

7. A method as recited in claim 1, further comprising:
   processing the received signal including the first data stream associated with the first processing path and a second data stream associated with a second processing path, the two clocks including the first phase indeterminate clock and a second phase indeterminate clock;
   synchronizing the second data stream associated with the second phase indeterminate clock with the first data stream associated with the first phase indeterminate clock; and
   switching from the first phase indeterminate clock when the second phase indeterminate clock transitions to the predetermined state and the second data stream is synchronized with the first data stream so as to generate the output clock from the second phase indeterminate clock.

8. A method as recited in claim 1, wherein:
   the two clocks include the first phase indeterminate clock and an internal clock associated with a UWB receiver; and
   the method further comprises switching to the internal clock when the state of the internal clock transitions the state associated with the selected clock so as to generate the output clock from the internal clock.

9. A method as recited in claim 1, further comprising processing a received signal on the first processing path and a second processing path associated with the device, and wherein the determining further includes comparing a first metric associated with the received signal on the first processing path with a second metric associated with the received signal on the second processing path.

10. A method as recited in claim 9, wherein the first metric includes a first signal-to-noise ratio (SNR) and the second metric includes a second SNR.

11. A circuit for switching between two clocks in an electronic device, the circuit comprising:
   a source associated with the two clocks;
   a controller coupled to the source, the controller configured to:
      generate an output clock from a selected one of the two clocks;
      generate a switch request signal;
      wait for the selected clock to transition to a predetermined state; and
      hold the output clock in the predetermined state when the switch request signal is generated until the other of the two clocks transitions to the predetermined state, if the other of the two clocks is not in the predetermined state when the switch request signal is generated; and
   a receiver portion having a first signal path and a second signal path processing the received signal,
   wherein the two clocks include two phase indeterminate clocks,
   wherein the received signal includes a first data stream associated with the first signal path and a second data stream associated with the second signal path,
   wherein the controller, in the generating the switch request signal, is further configured to generate the switch request signal when a signal metric associated with the received signal on one of the first signal path and the second signal path meets a predetermined criteria when compared to a reference value associated with the received signal on the other of the first signal path and the second signal path associated with the selected one of the two clocks, and
   wherein the controller is further configured to synchronize one of the first data stream and the second data stream with an other of the first data stream and the second data stream associated with the selected clock when the switch request is generated.

12. A circuit as recited in claim 11, wherein the controller is further configured to switch to the other of the two clocks when the other of the two clocks transitions to the predetermined state so as to generate the output clock from the other of the two clocks.

13. A circuit as recited in claim 11, wherein the first signal path and the second signal path include a first receiver finger and a second receiver finger associated with a UWB receiver.

14. A circuit as recited in claim 11, further comprising a system clock, and wherein the controller is further configured to switch to the system clock when a state of the system clock transitions the predetermined state associated with the selected one of the two clocks so as to generate the output clock from the system clock.

15. A circuit as recited in claim 11, wherein the controller includes one of a digital signal processor, an application specific integrated circuit (ASIC), and a general purpose processor.

16. A system for switching between two clocks in a communication device, the system comprising:
 a Physical Layer (PHY) portion processing a received signal; and
 a Media Access Control (MAC) portion,
 wherein the PHY portion comprises a digital baseband controller configured to:
  generate an output clock from a selected one of the two clocks;
  generate a switch request signal;
  wait for the selected clock to transition to a predetermined state;
  hold the output clock in the predetermined state when the switch request signal is generated until one of the two clocks different from the selected one transitions to the predetermined state, if the one of the two clocks is not in the predetermined state when the switch request signal is generated,
 wherein the PHY portion further comprises a first receiver finger and a second receiver finger associated with processing the received signal in the communication device, the received signal including a first phase indeterminate clock associated with the first receiver finger and a second phase indeterminate clock associated with the second receiver finger, the two clocks including the first phase indeterminate clock and the second phase indeterminate clock,
 wherein the received signal includes a first data stream associated with the first receiver finger and a second data stream associated with the second receiver finger,
 wherein the digital baseband controller is further configured to synchronize one of the first data stream and the second data stream with an other of the first data stream and the second data stream associated with the selected one of the first phase indeterminate clock and the second phase indeterminate clock when the switch request is generated, and
 wherein the digital baseband controller, in generating the switch request signal is further configured to generate the switch request signal when a signal metric associated with the received signal on one of the first receiver finger and the second receiver finger meets a predetermined criteria when compared to a reference value associated with the received signal on the other of the first receiver finger and the second receiver finger associated with the selected one of the two clocks.

17. A system as recited in claim 16, wherein the digital baseband controller is further configured to switch to the one of the two clocks when the one of the two clocks transitions to the predetermined state so as to generate the output clock from the one of the two clocks.

18. A system as recited in claim 16, further comprising a system clock, and wherein the digital baseband controller is further configured to switch to the system clock when a state of the system clock transitions the predetermined state associated with the selected one of the two clocks so as to generate the system clock from the one of the two clocks.

19. A system as recited in claim 16, wherein the digital baseband controller includes one of a digital signal processor, an application specific integrated circuit (ASIC), and a general purpose processor.

20. A method as recited in claim 1, wherein the controller is further configured to synchronize the first data stream received on the first processing path with a second data stream received on a second processing path associated with the processing of the received signal.

* * * * *